Jan. 30, 1940.　　　　H. W. HOUSE　　　　2,188,353
REMOVAL OF DIRT
Filed April 2, 1937
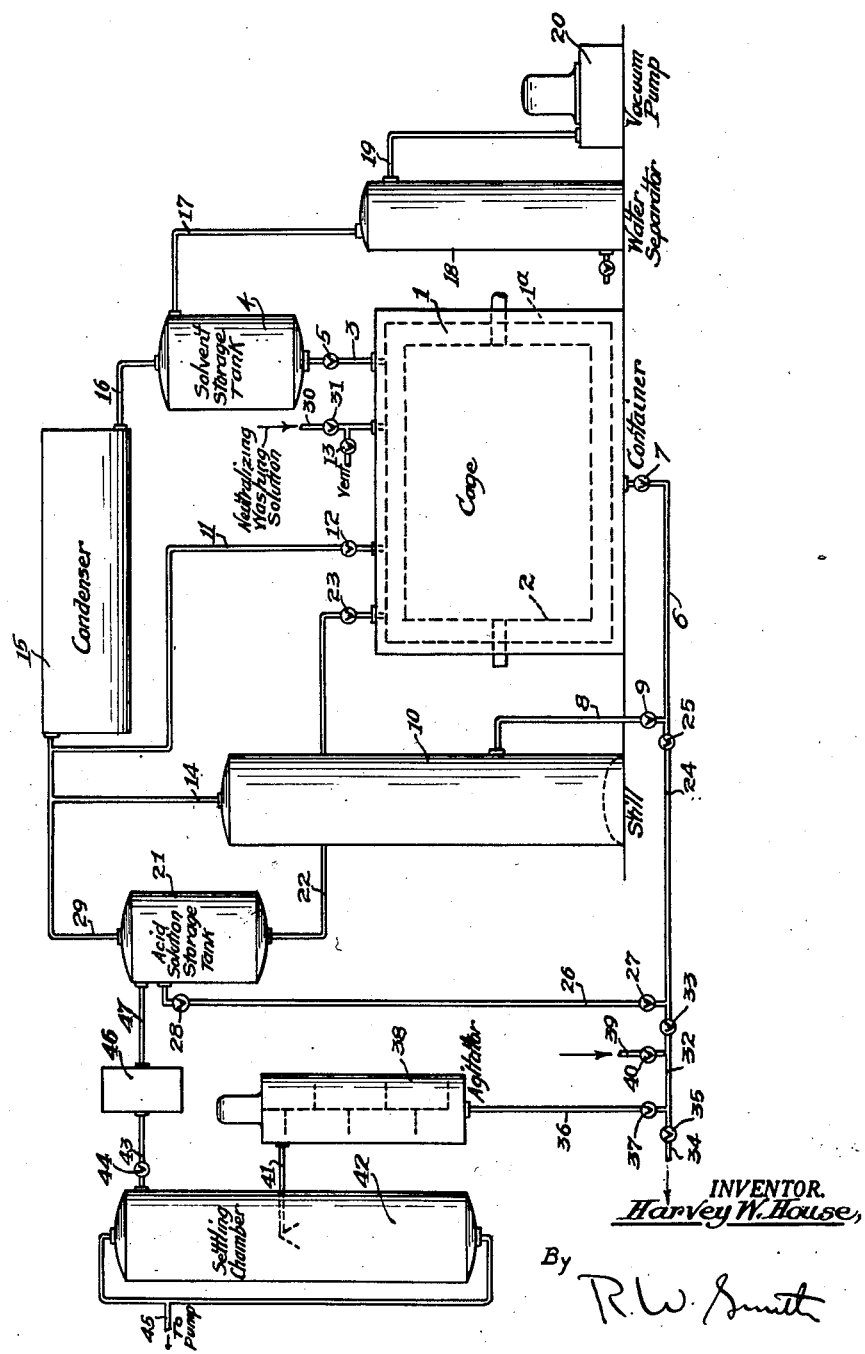
INVENTOR.
*Harvey W. House*,
By
R. W. Smith

UNITED STATES PATENT OFFICE 2,188,353

REMOVAL OF DIRT

Harvey W. House, Pasadena, Calif., assignor to Engineering Incorporated, Los Angeles, Calif., a corporation of California Application April 2, 1937, Serial No. 134,589

4 Claims. (Cl. 8—142)

This invention is a method of removing dirt; and has for its object to deposit a detergent-forming substance in the material which is to be cleaned, in such manner as to insure intimate contact of the detergent-forming substance with any dirt which may be embedded in the material.

It is a further object of the invention to utilize a volatile solvent as a means for impregnating material with a detergent-forming substance, and to then evaporate the solvent prior to washing the material, so as to leave the detergent-forming substance concentrated in intimate contact with any dirt which may be embedded in the material.

It is a still further object of the invention to preferably employ a detergent-forming substance which is insoluble in the medium which is employed as the washing medium, and which requires the chemical action of a second substance to develop its detergent characteristics.

It is a still further object of the invention to employ a solvent for the detergent-forming substance, which is of low surface tension and low viscosity so as to insure penetration of the material by the detergent-forming substance, for intimate contact of the dissolved detergent-forming substance with any dirt which may be embedded in the material.

It is a still further object of the invention to employ a highly volatile solvent, so that when the dissolved detergent-forming substance has been brought into intimate contact with any dirt which may be embedded in the material, the solvent may be readily evaporated to leave the detergent-forming substance concentrated in the material.

More particularly it is an object of the invention to impregnate material with a soap-forming acidic substance, e. g. the acid obtained by hydrolysis of any suitable vegetable or animal oil or fat, or such acidic soap-forming substances as sulfonated fatty acids, or substances such as rosin which contain similar acidic substances.

It is a still further object of the invention to concentrate the soap-forming acidic substance in the material which is to be cleaned, and to then neutralize the soap-forming acidic substance while it is in intimate contact with any dirt which may be embedded in the material, so as to form soap in concentrated form, at the point where it may disperse and most efficiently remove dirt.

It is a still further object of the invention to neutralize the soap-forming acidic substance which has been concentrated in the material, by a solution of a neutralizing soap-forming agent, in the solvent of which the soap-forming acidic substance is preferably insoluble, so that the soap-forming acidic substance remains concentrated in the material until reacted upon by the neutralizing agent to form soap in intimate contact with any dirt which may be embedded in the material.

It is a still further object of the invention to supply the neutralizing soap-forming agent by dissolving it in a medium in which the material, impregnated with the concentrated soap-forming acidic substance, is then washed. The washing medium penetrates the material sufficiently to bring the neutralizing agent and the soap-forming acidic substance into intimate contact for forming soap in the material in direct contact with any dirt which may be embedded therein, thereby removing the dirt with the soap emulsion when the latter is rinsed out by the washing medium.

It is a still further object of the invention to subsequently recover and reuse the soap-forming acidic substance which has been converted to soap, and which soap has then been rinsed out by the washing medium.

The invention is particularly applicable for use supplementary to dry-cleaning methods of removing grease and the like from fibrous material such as cloth, and in which dry-cleaning methods the material is treated with a suitable solvent, such as a hydrocarbon or chlorinated hydrocarbon solvent, which will extract grease and the like but which may leave carbon deposits or other residual dirt embedded in the material.

The invention provides for removing such carbon deposits and other residual dirt. For this purpose the solvent which has been employed for any usual dry-cleaning method, is drained off if such a dry-cleaning method has been employed preliminary to use of the present invention, and the material is then impregnated with a solution of a detergent-forming substance. This solution penetrates the material, and its solvent is then evaporated, leaving the detergent-forming substance concentrated in the material, in intimate contact with any dirt which may be embedded therein, so that by then washing the material the detergent-forming substance and the dirt may be rinsed out.

The detergent-forming substance is preferably a soap-forming acidic substance, which when it has been concentrated in the material is preferably then treated with a washing solution of a neutralizing soap-forming agent, in the solvent of which the soap-forming acidic substance is preferably insoluble. This washing solution penetrates the material sufficiently to bring the dissolved neutralizing agent into intimate contact with the soap-forming acidic substance which has been concentrated in the material. Soap is thus formed in the material, in intimate contact with any carbon deposits or other residual dirt which may be embedded therein, and the washing solution then rinses out the soap and the dirt which has been emulsified thereby.

Further objects of the invention will be readily understood from the following description, together with the accompanying diagrammatic drawing showing preferred apparatus which may be employed.

The invention, while of general applicability for removing dirt from material, is particularly adapted for use in connection with the dry-cleaning of material such as fibrous material, cloth for example; and for purpose of illustration the invention is hereinafter described in connection with such a dry-cleaning process.

The apparatus which is employed may include a container 1, in which is mounted a rotatable cage 2 adapted to receive the material which is to be cleaned. The container 1 has a solvent inlet conduit 3, supplied from a storage tank 4 and provided with a valvular control 5, and has a drain conduit 6 provided with a valvular control 7. A branch conduit 8, having a valvular control 9, leads from the drainage conduit 6 to a still 10. A conduit 11 leads from the container 1 for withdrawal of solvent vapors, and is provided with a valvular control 12. The container 1 preferably has a valve controlled vent 13 whereby the container may be opened to the atmosphere.

The vapor conduit 11, and a vapor conduit 14 which communicates with the still 10, preferably lead to a condenser 15 which in turn communicates with the storage tank 4 via a conduit 16. The solvent condensate from the condenser is collected in the storage tank 4, while the water condensate and any remaining vapors are withdrawn via conduit 17 to a water separator 18. Vapors are withdrawn from the water separator via conduit 19 which leads to a vacuum pump 20 by means of which the entire system may be maintained under partial vacuum.

In the cycle of operation, the material which is to be cleaned and which is in the cage 2, is impregnated with solvent which is supplied to the container 1 from the storage tank 4. The solvent may be any usual solvent, preferably one of the chlorinated hydrocarbon solvents such as trichlorethylene. After the solvent has extracted grease and the like from the material, it is drained off via conduits 6 and 8 and is then regenerated in the still 10. The solvent vapors of the distillation process are withdrawn from the still via conduit 14, preferably by the partial vacuum which may be maintained in the system, and are then condensed and returned to the storage tank 4.

After the solvent has been drained off, the material is preferably centrifuged by rotating the cage 2; and the material is thus freed of all solvent except that relatively small quantity which remains impregnated in the material and which in the case of fibrous material such as cloth may amount to approximately 15 lbs. of solvent for each 100 lbs. of cloth. If desired, this small residue of solvent may be evaporated by heating the material. For this purpose the container 1 may be steam jacketed as shown at 1ª. The solvent vapors which are evaporated are withdrawn via the conduit 11, preferably by the partial vacuum which may be maintained in the system, and are then condensed and returned to the storage tank 4.

Material which has been thus cleaned will have had grease and the like extracted therefrom, but such extraction may have left carbon deposits and other residual dirt embedded in the material, particularly in the case of fibrous material such as cloth.

The present invention provides for removing such carbon deposits and other residual dirt, the invention being preferably employed subsequent to the solvent extraction process which has been previously described, and after draining off the solvent and centrifuging the material, but without evaporating the small quantity of solvent which remains impregnated in the material.

For the purpose of the present invention the apparatus previously described may include a storage tank 21. This storage tank has a conduit 22 leading to the container 1 and provided with a valvular control 23. A conduit 24 is connected to the drainage conduit 6 and has a valvular control 25; and a conduit 26, provided with valvular controls 27—28, leads from the conduit 24 to the storage tank 21. A vapor conduit 29 preferably communicates with the storage tank 21, and leads to the condenser 15.

The storage tank 21 contains a solution of a detergent-forming substance. The solvent in which the detergent-forming substance is dissolved, is preferably a solvent of low surface tension and low viscosity so that the solution may readily penetrate the material in the cage 2, and is preferably highly volatile so that it may be subsequently readily evaporated from the material. Solvents such as are generally employed for solvent extraction of grease, e. g. hydrocarbon and chlorinated hydrocarbon solvents, have the desired characteristics; and therefore in order to simplify the process and the necessary apparatus, the solvent for the detergent-forming substance is preferably identical with the solvent contained in the storage tank 4 and which has been used in the initial solvent extraction process, e. g. these solvents may both be trichlorethylene.

The detergent-forming substance is preferably a soap-forming acidic substance such as the acid obtained by hydrolysis of any suitable vegetable or animal oil or fat, or such acidic soap-forming substances as sulfonated fatty acids, or substances such as rosin which contain similar acidic substances. In practice, a fatty acid such as oleic acid may be employed, or a more economical mixture of various fatty acids, as acidulated soap stock may be used. The solution of the soap-forming acidic substance may be approximately 10% by weight of fatty acid and 90% by weight of solvent.

After grease and the like has been extracted from the material in the cage 2, and the solvent has been drained off and the material has been centrifuged as previously described, the detergent-forming solution containing in the storage tank 21 is supplied to the container 1 via the conduit 22. This solution impregnates the material, and the excess is then drained off and returned to the tank 21 via the conduits 24 and 26, leaving the material impregnated with the solution. The solvent of the solution is then evaporated, leaving the detergent-forming substance concentrated in the material, and consequently in intimate contact with any carbon deposits or other residual dirt which the initial solvent extraction process may have failed to remove.

The partial vacuum in the system may draw the excess of the detergent-forming solution back to the tank 21 from the container 1, with said partial vacuum exerted via the conduits 24—26—29; and when the excess of the solution has been drained off, and the solvent of the solution which remains in the material is then to be evaporated, the container 1 may be heated by the steam jacket 1a, with the partial vacuum in the system withdrawing the solvent vapors via the conduit 11.

The material, in which the detergent-forming substance has been concentrated, is then washed. When the detergent-forming substance is a soap-forming acidic substance such as requires the chemical action of a second substance to develop its detergent characteristics, the washing medium is a solution of a neutralizing agent which will react with the soap-forming acidic substance to form soap.

The neutralizing solution is caused to penetrate the material sufficiently for intimate contact of the neutralizing agent with the soap-forming acidic substance; and for this purpose the solvent of the neutralizing solution is preferably such as will not dissolve the soap-forming acidic substance except by chemical action of the solute, thereby leaving the acidic substance concentrated in the material until the neutralizing agent and the acidic substance have reacted to form soap in direct contact with any residual dirt which may be embedded in the material. The neutralizing solution is also such as will make soap emulsion as fast as the soap is formed, and which will then wash away the soap and the residual dirt, leaving the material clean.

As an instance of a suitable neutralizing and washing solution, the solvent for the neutralizing agent is preferably water, and the neutralizing agent may be any suitable hydroxide or alkaline salt which will neutralize fatty acids to form soap. Various alkalies such as usually employed in soap-making may be advantageously employed, and in practice soda ash or trisodium phosphate is preferably employed.

After the detergent-forming substance has been concentrated in the material which is to be cleaned, the material may be removed from the container 1 to any usual washer, or the material may remain in the container 1 for the washing operation. To provide for washing in the container 1, a conduit 30 having a valvular control 31 may supply the washing medium to the container, and the material in the rotatable cage 2 is then agitated in the washing medium. The washing medium thus contacts the detergent-forming substance while the latter is in intimate contact with any residual dirt which may be embedded in the material, thereby washing out the emulsified dirt along with the detergent. The dirty washing medium may then be drained off through the conduits 6—24, and thence via a conduit 32 which communicates with the conduit 24, the valve 27 having been closed and a valve 33 in the conduit 32 having been opened.

The dirty washing medium may be discharged via a drain 34 having a valvular control 35, or when the dirty washing medium is a soapy solution resulting from a neutralizing solution having reacted with a soap-forming acidic substance which has been concentrated in the material which is to be cleaned, a soap-forming acidic substance such as oleic acid may be recovered from the soapy solution. To permit such recovery, the dirty washing medium, e. g. soapy water, may be drawn off through a branch conduit 36, the valve 35 having been closed. This branch conduit 36 has a valvular control 37, and may lead from the conduit 32 to an agitator 38, wherein the soapy water is acidified.

The soapy water may be acidified by any suitable acid, e. g. sulphuric acid, which may be supplied to the conduit 32 via a conduit 39 having a valvular control 40. From the agitator 38 the acidified solution may be drawn via conduit 41 into a settling chamber 42, wherein the soap-forming acidic substance which has been liberated by acidification, collects in the upper portion of the settling chamber, being of lower density than water and insoluble therein, and from whence the soap-forming acidic substance may be withdrawn via conduit 43 having a valvular control 44, with the waste water drawn off via conduit 45 which is provided with a suitable pump (not shown).

The soap-forming acidic substance which is withdrawn from the settling chamber may be returned to the storage tank 21, preferably by the partial vacuum which may be maintained in the system, with the soap-forming acidic substance preferably purified by passing through a filter 46 which may be connected to the conduit 43, and from whence a conduit 47 returns the purified acidic substance to the storage tank 21.

The invention thus provides for efficiently removing dirt from material, particularly fibrous material such as cloth which has been dry-cleaned for extracting oil and grease but in which carbon deposits and other residual dirt may remain embedded; the invention providing for concentrating a detergent-forming substance in the material which is to be cleaned, preferably a soap-forming acidic substance, and then washing the material, preferably in a medium in which the concentrated detergent-forming substance is insoluble, with the washing medium preferably a solution of a neutralizing agent which may thus be brought into intimate contact with a soap-forming acidic substance which has been concentrated in the material, so that soap is formed in direct contact with any residual dirt which may be embedded in the material, and with the washing solution forming a soap emulsion as fast as the soap is formed, and then rinsing out the soap and the emulsified dirt.

While the invention is particularly applicable and has been described as used in connection with preliminary solvent extraction of oil and the like, it will be understood that the invention may be employed for cleaning any material which contains dirt which may be washed out by a suitable detergent, whether or not the material has been subjected to a preliminary solvent extraction dry-cleaning process.

I claim:

1. In the removal of dirt from material, the steps including: impregnating the material with a solution of a detergent-forming substance, draining off excess solution by a partial vacuum maintained in the system, heating the material while under partial vacuum so as to evaporate the solvent of the solution from the material and leave the detergent-forming substance concentrated in the material, and treating the concentrated detergent-forming substance with an agent which reacts therewith to form a detergent.

2. In the removal of dirt from material, the steps including: impregnating the material with a solution of a soap-forming acidic substance, evaporating the solvent of the solution from the material so as to leave the soap-forming acidic substance concentrated in the material, and neutralizing the soap-forming acidic substance so as to form soap in the material.

3. In the removal of dirt from material, the steps including: impregnating the material with a solution of a detergent-forming substance, evaporating the solvent of the solution from the material so as to leave the detergent-forming substance concentrated in the material, and treating the concentrated detergent-forming substance with an agent which reacts therewith to form a detergent.

4. In the removal of dirt from material, the steps including: impregnating the material with a solution of a saponifiable detergent-forming substance, evaporating the solvent of the solution so as to leave the saponifiable detergent-forming substance concentrated in the material, and treating the concentrated saponifiable detergent-forming substance with a saponifying agent.

HARVEY W. HOUSE.